UNITED STATES PATENT OFFICE.

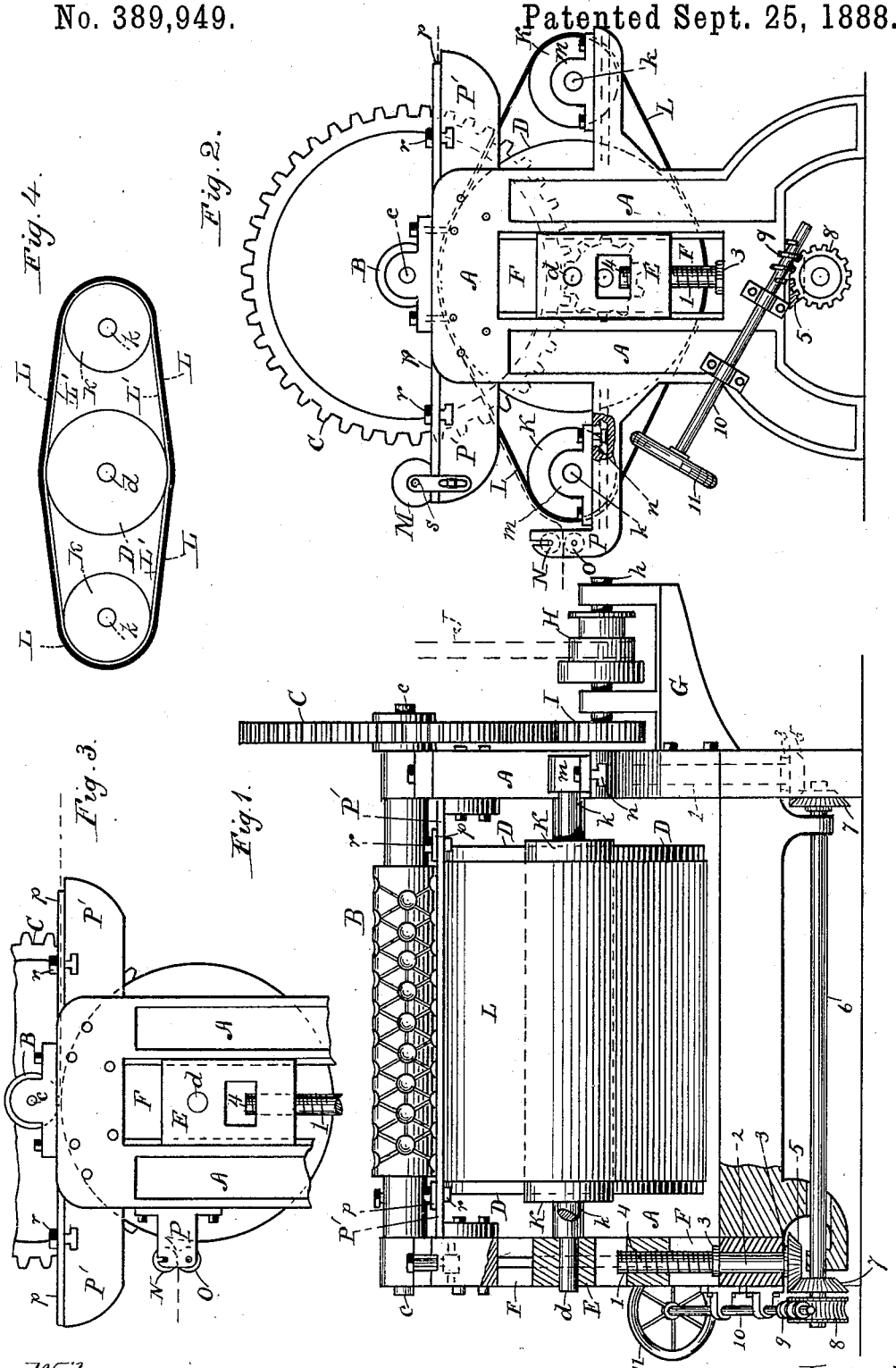

JACOB M. BAKER, OF BOSTON, MASSACHUSETTS.

EMBOSSING-MACHINE.

SPECIFICATION forming part of Letters Patent No. 389,949, dated September 25, 1888.

Application filed June 23, 1887. Serial No. 242,334. (No model.)

*To all whom it may concern:*

Be it known that I, JACOB M. BAKER, of Boston, in the county of Suffolk and State of Massachusetts, have invented certain new and useful Improvements in Embossing-Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention consists of an improved method of embossing any flexible material capable of being embossed by impressing said material between the die, upon which is a raised or depressed pattern, and a body of soft rubber or other elastic material; and it also consists in the employment of a metal roller upon which is the raised or depressed pattern, in combination with a belt of elastic material; and it also consists in certain details of construction and combinations, all as more particularly hereinafter described.

In the accompanying drawings, Figure 1 is a front elevation of the machine. Fig. 2 is an end view of the same. Fig. 3 illustrates a detail of the feed-rolls as applied to a machine having an elastic roll instead of a belt, and Fig. 4 is a modification.

A A are the vertical supports or frame of the machine.

B is the embossing-roll, upon which is a raised or depressed pattern. Upon one end of the shaft c of this roller, and outside of the frame A, is secured a gear, C. Below the roll B is suspended a roll, D, and the shaft d of this roll is mounted in bearings E, which are adjustable vertically in a slot, F, in the side frames, A.

G is a bracket extending out beyond one end of the frame of the machine and supporting the shaft h, upon which are the cone-pulley H and pinion I. The motion is transmitted through the belt J to the pulley H and pinion I, and from thence to the gear C, which engages with said pinion.

K K are two pulleys, which are hung horizontally on the frame on either side of the roller D, and with their axes parallel with the axis of said roller. The elastic belt L, of soft rubber or other appropriate material, is stretched over the pulleys K K and the roller D and will pass between the rolls B and D. The shafts k k of the pulleys K K are mounted in bearings m m, which are laterally adjustable in horizontal slots n n in the frame A, for the purpose of regulating the tightness or slack of the belt L.

The roll D may, if desired, be covered with a coating of soft rubber or other elastic material to give a cushion to the belt, and also to prevent the same from slipping and causing much wear on the belt by friction; or a supplemental belt, L', of the same material as L, or of firmer and harder material may be used under the belt L for the same purpose. (See Fig. 4.)

When the roller B is revolved by the means above described, it will, by frictional contact with the belt L, cause the latter to revolve upon the pulleys K K, and the roller D will also revolve by frictional contact with the belt and form a bearing for the same under the roller B, and for the material when it is being embossed. The elastic belt as it rotates in conjunction with the embossing metallic roll forces the material to be embossed against the said roll, and the required impression will be imparted to the material as it passes between the said roll and the elastic belt, and it is even more effective than if the design were engraved on two metal rolls.

A little beyond one of the rolls K are two feed-rolls, N O, hung in bearings P and parallel with the roll K. One of these rolls, N, is vertically adjustable to the other roll, O. The strip of material in passing between these rolls will have all the irregularities pressed out of it, and it will ride over the surface of the belt L, conforming with the same until it passes between it and the roll B to be embossed.

P' is a horizontal table, which is attached to the frame of the machine, and with its upper surface opposite or nearly opposite the line of contact of the roll B and belt L, and transversely upon this table are two strips, p, which are at right angles to the roll and adjustably movable toward or away from each other by means of slots in the table P' and the adjusting-bolts r. A short distance beyond the line of contact of the roll and belt, and attached to the table by a vertical adjustment, s, is a lazy friction-roller, M.

The above-described mechanism may be used for feeding the material between the roll B and the belt L in place of the rolls N O, if desired. In such case the table P' forms a support for the material as it is being fed, and said table and the two strips p p form guides for the material, and are adapted to be adjusted to allow different widths of the same to pass between them. The material is intended to be passed in a strip between the roller M and the table, and then between the strips p p before it is passed under the roll B.

The roll D, instead of being of so much greater diameter than the rolls K, may be of the same or even smaller diameter than said rolls; but I prefer to use a larger roll on account of its giving a greater surface to the material to be embossed. The roll D may also be vertically adjustable by any appropriate means; but a very convenient arrangement of mechanism is the following:

The adjusting-screws 1 1, for raising and lowering the bearings E of the shaft d, are smooth and unthreaded at their lower portion, 2, and revolve in a smooth hole in the frame, and are retained in position there by collars 3 3. The upper portion, 4, of the screw is threaded and passes through a threaded hole in the adjustable bearings E. Now when the screws 1 1 are revolved, instead of their rising and falling, they simply revolve, while the adjustable bearings E E rise and fall on the screws. These screws 1 1 may be operated as follows: On the lower end of each screw is a bevel-gear, 5, and suspended below them is a horizontal shaft, 6, having a bevel-gear, 7, near each end, which engage with the gears 5. Beyond one of the gears 7 on the shaft 6 is a worm-wheel, 8, and this engages with a worm, 9, which has on the opposite end of its shaft 10 a hand-wheel, 11, or a crank. By turning this wheel 11 or crank one way or the other the screws 1 1 (through the instrumentality of the worm 9, wheel 8, and gears 7 and 5) will revolve and raise or lower the adjustable bearings E. (The metal roll may also be raised or lowered by suitable mechanism.)

Prior to my invention, as described in this application and in my application filed April 30, 1886, Serial No. 200,647, when embossing has been done by two cut or engraved rolls, in order that the rolls will produce satisfactory results and true patterns therefor, the die of one roll must fit exactly into the female die of the other roll, and vice versa, throughout their entire surfaces. This is almost if not quite impossible to accomplish, and even to attain this result as near as possible it will require a large experience and very careful and accurate measurement to get the dies to fit each other. By my invention all this difficulty is avoided, for when the elastic belt or an elastic roll is used in connection with the embossing-roll the former will conform itself to the die on the embossing-roll and force itself and the material with it into said die, besides which, being elastic, it will spread out and cover a larger surface of the material than a metallic roller, and thus make more of a pattern on the material at the same instant.

I am aware that embossing has been done by means of a rubber roll in combination with a roll having a raised or depressed pattern, as shown and described in my patent, No. 366,755, dated July 19, 1887. I am also aware that an endless belt or apron has been used before for feeding material to another part of an apparatus. These, therefore, I do not claim; but What I do claim is—

1. In an embossing machine, the combination of a roll having a raised or depressed pattern with a revolving belt of elastic material, whereby as a fabric is passed between the said roll and belt the impression on the roll will be imparted to the material.

2. In an embossing-machine, the combination of a roll having a raised or depressed pattern, and an elastic belt which is adapted to revolve by frictional contact between its outer surface and the surface of said roll, all substantially as shown and described.

3. The combination of the embossing-roll B, the elastic belt L, and roll D, all substantially as described, and operating as set forth.

4. The combination of the embossing-roll B, the elastic belt L, and the roll having the elastic coating, all substantially as described.

JACOB M. BAKER.

Witnesses:
D. G. HASKINS, Jr.,
PENNINGTON HALSTED.